(12) United States Patent
Wollenweber

(10) Patent No.: US 6,968,674 B2
(45) Date of Patent: Nov. 29, 2005

(54) METHODS AND APPARATUS FOR OPERATING GAS TURBINE ENGINES

(75) Inventor: Gary Craig Wollenweber, Cincinnati, OH (US)

(73) Assignee: General Electric Company, Niskayuna, NY (US)

( * ) Notice: Subject to any disclaimer, the term of this patent is extended or adjusted under 35 U.S.C. 154(b) by 193 days.

(21) Appl. No.: 10/352,446

(22) Filed: Jan. 28, 2003

(65) Prior Publication Data

US 2004/0144096 A1 Jul. 29, 2004

(51) Int. Cl.$^7$ ............................. F02C 6/00; F02K 3/04
(52) U.S. Cl. ........................ 60/204; 60/224; 60/226.1
(58) Field of Search .................. 60/39, 15, 204, 60/224, 225, 226.1, 772, 263, 264

(56) References Cited

U.S. PATENT DOCUMENTS

| | | | |
|---|---|---|---|
| 3,517,509 A | * | 6/1970 | Bayati ........................ 60/224 |
| 4,192,137 A | | 3/1980 | Chappell et al. |
| 4,222,233 A | | 9/1980 | Johnson et al. |
| 4,631,914 A | | 12/1986 | Hines |
| 4,679,394 A | * | 7/1987 | Taylor ........................ 60/224 |
| 5,160,080 A | | 11/1992 | Hines et al. |
| 6,415,597 B1 | * | 7/2002 | Futamura et al. ............. 60/224 |
| 6,457,305 B1 | | 10/2002 | Schierbaum |
| 6,634,596 B2 | * | 10/2003 | Albero et al. ................. 60/224 |

* cited by examiner

*Primary Examiner*—Louis J. Casaregola
(74) *Attorney, Agent, or Firm*—Richard A. DeCristofaro; Patrick K. Patnode

(57) ABSTRACT

A method facilitates operating a gas turbine engine assembly including a propelling engine and an auxiliary power engine. The method comprises channeling a portion of airflow entering an inlet to the propelling gas turbine engine through a fan assembly and a bypass duct such that the air bypasses the core engine, and channeling a portion of airflow from the bypass duct towards the auxiliary power engine.

23 Claims, 1 Drawing Sheet

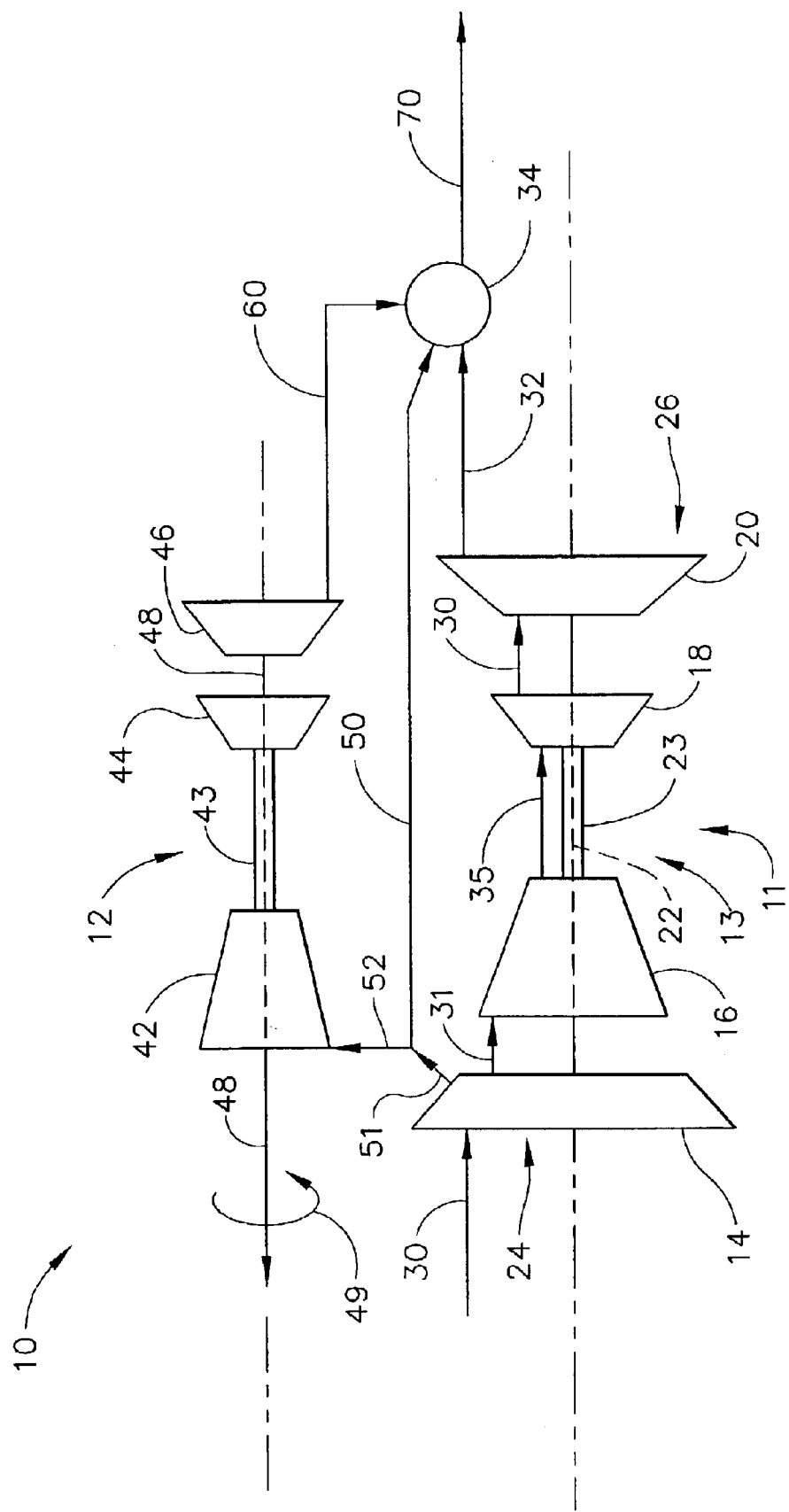

METHODS AND APPARATUS FOR OPERATING GAS TURBINE ENGINES

BACKGROUND OF THE INVENTION

This invention relates generally to the gas turbine engines, and, more particularly, to methods and apparatus for operating gas turbine engines used for aircraft propulsion and auxiliary power.

Gas turbine engines typically include a compressor for compressing air. The compressed air is mixed with a fuel and channeled to a combustor, wherein the fuel/air mixture is ignited within a combustion chamber to generate hot combustion gases. The combustion gasses are channeled to a turbine, which extracts energy from the combustion gases for powering the compressor, as well as producing useful work. The exhaust gases are then discharged through an exhaust nozzle, thus producing a reactive, propelling force.

Modern aircraft have increased hydraulic and electrical loads. An electrical load demanded of gas turbine engines increases as flight computers, communication equipment, navigation equipment, radars, environmental control systems, and defensive systems are coupled to aircraft. A hydraulic load demanded of gas turbine engines increases as flight controls, pumps, actuators, and other accessories are coupled to the aircraft. Within at least some known aircraft, mechanical shaft power is used to power hydraulic pumps, electrical generators and alternators. More specifically, electrical and hydraulic equipment are typically coupled to an accessory gearbox that is driven by a shaft coupled to the turbine. When additional electrical power or hydraulic power is required, additional fuel is added to the combustor until a predefined maximum temperature and/or power operating level is reached.

Because the density of air decreases as the altitude is increased, when the aircraft is operated at higher altitudes, the engine must work harder to produce the same shaft power that the engine is capable of producing at lower altitudes. As a result of the increased work, the turbine may operate with increased operating temperatures, such that the shaft power must be limited or reduced to prevent exceeding the engine predefined operating limits.

Within at least some known gas turbine engines, electrical power and hydraulic power is also generated by an auxiliary power unit (APU). An APU is a small turbo-shaft engine that is operated independently from the gas turbine engines that supply thrust for the aircraft. More specifically, because APU operation is also impacted by the air density and are also operationally limited by predefined temperature and performance limits, APUs are typically only operated when the aircraft is on the ground, or in emergency situations while the aircraft is in flight.

BRIEF DESCRIPTION OF THE INVENTION

In one aspect, a method for operating a gas turbine engine including a fan, bypass duct, and a core engine is provided. The method comprises channeling a portion of airflow exiting the fan of the gas turbine engine through a bypass duct such that the air bypasses the core engine, and channeling a portion of airflow from the bypass duct towards an auxiliary power unit.

In another aspect of the invention, a gas turbine engine assembly for use with an aircraft is provided. The gas turbine engine assembly comprises a propelling gas turbine engine and an auxiliary power unit. The gas propelling turbine engine includes a fan and a core engine for generating thrust for the aircraft, and a bypass duct that extends downstream from the fan to the core engine exhaust. The auxiliary power unit includes a compressor, a combustor, at least one turbine and an inlet, wherein the inlet is coupled in flow communication with the gas turbine engine bypass duct, such that a portion of airflow exiting the engine fan is channeled for used by the auxiliary power unit.

In a further aspect, an aircraft gas turbine engine assembly is provided. The assembly includes at least one gas turbine engine, and at least one auxiliary power unit. The at least one gas turbine engine includes an inlet, an exhaust, a fan, a core engine, and a bypass duct. The core engine extends between a discharge of the fan and the exhaust. The bypass duct also extends downstream from the fan discharge to the core exhaust. The at least one auxiliary power unit includes an inlet, a compressor, a combustor, at least one turbine, and an exhaust. The inlet is coupled in flow communication with the gas turbine engine bypass duct, such that a portion of airflow entering the gas turbine inlet is channeled for use by the auxiliary power unit.

BRIEF DESCRIPTION OF THE DRAWINGS

FIG. 1 is an exemplary schematic view of a gas turbine engine assembly.

DETAILED DESCRIPTION OF THE INVENTION

FIG. 1 is an exemplary schematic view of a gas turbine engine assembly 10 including a propelling gas turbine engine 11 and an auxiliary power unit or auxiliary power engine 12 that are coupled together, as described in more detail below, in a combined cycle. More specifically, gas turbine engine assembly 10, as described in more detail below, facilitates producing shaft power and propelling force for an aircraft (not shown).

Gas turbine engine 11 includes a core engine 13 and a fan assembly 14. Core engine 13 includes a high-pressure compressor 16, and a combustor (not shown). Core engine 13 also includes a high-pressure turbine 18 and a low-pressure turbine 20. Fan assembly 14 and turbine 20 are coupled by a first shaft 22, and compressor 16 and turbine 18 are coupled by a second shaft 23. Gas turbine engine 11 also includes an inlet side 24 and an exhaust side 26. In one embodiment, engine 11 is a F118-GE-100 turbofan engine commercially available from General Electric Aircraft Engines, Cincinnati, Ohio.

In operation, inlet air, represented by arrow 30, enters fan assembly 14, wherein the air is compressed and a portion of air, represented by arrow 31, is discharged downstream at an increased pressure and temperature to high-pressure compressor 16. The remaining portion of fan discharge air, represented by arrow 51, enters bypass duct 50. Highly compressed air 35 is delivered to a combustor (not shown) wherein it is mixed with fuel and ignited. Combustion gases propel turbines 18 and 20, which drive compressor 16 and fan assembly 14, respectively. Core engine exhaust 32 flows to mixing damper 34 that is coupled in flow communication with air 51 entering bypass duct 50. In an alternative embodiment, core engine exhaust 32 is channeled to a variable area bypass injector (not shown) that is coupled in flow communication with core engine exhaust 32.

Auxiliary power engine 12 includes a compressor 42, a high-pressure turbine 44, and a low-pressure turbine 46. Compressor 42 and high-pressure turbine 44 are connected by a first shaft 43 such that as combustion gases propel turbine 44, turbine 44 drives compressor 42. Auxiliary engine 12 also includes a second shaft 48 coupled to low-pressure turbine 46 which provides shaft power output, represented by arrow 49, for use in the aircraft. Power output 49 may be used to drive equipment, such as, but not limited to alternators, generators, and/or hydraulic pumps. In one embodiment, auxiliary power engine 12 is a turbo-shaft engine, such as a T700-GE-701 engine that is commercially available from General Electric Company, Cincinnati, Ohio, and that has been modified in accordance with the present invention.

During engine operation at higher operating altitudes, airflow 30 is channeled through an aircraft engine inlet (not shown) and through fan assembly 14 towards core engine 13. A portion 51 of airflow 30 is then channeled around core engine 13 through bypass duct 50. More specifically, airflow 51 entering bypass duct 50 is channeled around core engine 13 towards mixing damper 34. In one embodiment, approximately fifty percent (50%) of airflow 30 entering fan assembly 14 is channeled through bypass duct 50.

A portion of airflow channeled through bypass duct 50 is diverted through an auxiliary duct 52 for use as auxiliary airflow with auxiliary power engine 12. More specifically, auxiliary airflow is routed from bypass duct 50 towards auxiliary engine compressor 42. In one embodiment, approximately 10% of air flowing into bypass duct 50 is channeled through auxiliary duct 52 to auxiliary power unit compressor 42 of auxiliary engine 12.

Auxiliary airflow directed towards auxiliary engine 12 through fan assembly 14 is at a higher pressure and temperature than airflow entering gas turbine engine assembly 10. Because the auxiliary airflow is at an increased pressure and temperature, a density of airflow entering auxiliary engine 12 is substantially similar to the density of airflow that enters auxiliary engine 12 at lower altitudes. More specifically, the power output of auxiliary engine 12 is proportional to the density of the inlet air. Accordingly, auxiliary engine 12 is operable at higher altitudes with substantially the same operating and performance characteristics that are available at lower altitudes by auxiliary engine 12. For example, when used with the F110/F118 family of engines, auxiliary engine 12 produces approximately the same horsepower and operating characteristics at an altitude of 30–40,000 feet, as would be obtainable if the auxiliary engine 12 was operating at sea level independently.

Exhaust airflow 60 from auxiliary power engine 12 is channeled towards core engine exhaust 32 at a discharge pressure that is substantially the same as a discharge pressure of exhaust flow 32 discharged from core engine 13. Specifically, in the exemplary embodiment, auxiliary engine exhaust airflow 60 is routed through mixing damper 34 wherein airflow 60 is mixed with exhaust flow 32 exiting core engine 13, and bypass flow channeled through duct 50. More specifically, exhaust airflow 60 is reintroduced to core engine upstream from a propelling core engine nozzle (not shown). The mixed exhaust flow 70 is then discharged through an engine nozzle (not shown). In an alternative embodiment, exhaust airflow 60 is not routed through core engine exhaust 32, but rather is discharged independently from exhaust flow 32 and bypass flow 50.

Accordingly, when operated, auxiliary power engine 12 facilitates providing increased shaft power production for use within the aircraft. More specifically, because auxiliary power engine 12 is selectively operable for shaft power production, auxiliary power engine 12 may be used only when needed, thus facilitating fuel conservation for the aircraft. In addition, the design of gas turbine assembly 10 enables auxiliary power engine 12 to be operated independently of propelling engine 11, such that an operating speed auxiliary power engine 12 is independent of an operating speed of core engine 11. Additionally the hydro mechanical or digital controls of propelling engine 11 and auxiliary power engine 12 are arranged to mutually exchange operational status and performance parameter values (pressure, temperature, RPM, etc) from one to the other.

The above-described power system is cost-effective and increases shaft power production. The power system includes an auxiliary turbine engine coupled in flow communication with a gas turbine engine such that inlet air provided to the auxiliary turbine is drawn through an inlet to the gas turbine engine. As such, higher density air is provided to the auxiliary engine than would be provided had the auxiliary engine received ambient inlet airflow through conventional means. As a result, the increased density of air facilitates increased shaft turbine power production from the auxiliary engine in a cost-effective and reliable manner.

Exemplary embodiments of gas turbine assemblies are described above in detail. The assemblies are not limited to the specific embodiments described herein, but rather, components of each assembly may be utilized independently and separately from other components described herein. For example, each turbine component and/or auxiliary turbine engine component can also be used in combination with other core engine and auxiliary turbine engine components.

While the invention has been described in terms of various specific embodiments, those skilled in the art will recognize that the invention can be practiced with modification within the spirit and scope of the claims.

What is claimed is:

1. A method for operating a gas turbine engine assembly including a propelling gas turbine engine including a core engine and a fan assembly, said method comprising:
    channeling a portion of airflow exiting the fan assembly through a bypass duct such that the air bypasses the core engine;
    channeling a portion of airflow from the bypass duct towards an auxiliary power engine; and
    channeling exhaust airflow from the auxiliary power engine to a mixing damper that is in flow communication with the propelling gas turbine engine.

2. A method in accordance with claim 1 wherein channeling a portion of airflow from the bypass duct further comprises supplying airflow to the auxiliary power engine that is at an increased pressure and temperature than airflow entering the propelling gas turbine engine through an inlet to the gas turbine engine.

3. A method according to claim 1 further comprising channeling exhaust airflow from the auxiliary power engine to an exhaust of the core engine.

4. A method according to claim 1 wherein channeling a portion of airflow from the bypass duct further comprises channeling a portion of the airflow to the auxiliary power engine to facilitate increasing shaft power production of the auxiliary power engine during engine operation.

5. A method according to claim 1 wherein the mixing damper is in flow communication with an exhaust of the core engine.

6. A method according to claim 1 wherein the mixing damper is in flow communication with the bypass duct of the propelling gas turbine engine.

7. A gas turbine engine assembly for use with an aircraft, said gas turbine engine assembly comprising:

a propelling gas turbine engine comprising a fan and a core engine for generating thrust for the aircraft, said gas turbine engine comprising a bypass duct extending downstream from an exit of said fan to said core engine;

an auxiliary power unit comprising at least one turbine and an inlet, said inlet coupled in flow communication with said gas turbine engine bypass duct, such that a portion of airflow entering said gas turbine engine bypass duct is channeled for use by said auxiliary power unit; and a mixing damper coupled in flow communication with an exhaust of said auxiliary power turbine and said propelling gas turbine engine.

8. A gas turbine engine assembly in accordance with claim 7 wherein said auxiliary power unit turbine receives airflow at an increased pressure and temperature than a pressure and a temperature of airflow entering said propelling gas turbine engine.

9. A gas turbine engine assembly in accordance with claim 7 wherein said auxiliary power unit turbine facilitates generating increased shaft horsepower from said auxiliary power turbine during operation of said gas turbine engine assembly.

10. A gas turbine engine assembly in accordance with claim 7 wherein said auxiliary power unit turbine positioned such that exhaust discharged from auxiliary power unit turbine is in flow communication with said gas turbine bypass duct.

11. A gas turbine engine assembly in accordance with claim 7 wherein the mixing damper is coupled in flow communication with an exhaust of said propelling gas turbine engine.

12. A gas turbine engine assembly in accordance with claim 7 wherein the mixing damper is coupled in flow communication with said bypass duct.

13. A gas turbine engine assembly in accordance with claim 7 wherein the mixing damper is coupled in flow communication with said bypass duct and an exhaust of said propelling gas turbine engine.

14. An aircraft gas turbine engine assembly, said assembly comprising:

at least one propelling gas turbine engine comprising an inlet, a fan, an exhaust, a core engine, and a bypass duct, said core engine extending between said fan and said exhaust, said bypass duct extending downstream from said fan and said exhaust;

at least one an auxiliary power unit comprising an inlet, at least one turbine, and an exhaust, said inlet coupled in flow communication with said gas propelling turbine engine bypass duct, such that a portion of airflow entering said propelling gas turbine inlet is channeled for use by said auxiliary power unit, and a mixing damper coupled in flow communication with said auxiliary power unit exhaust and said propelling gas turbine engine exhaust.

15. An aircraft gas turbine engine assembly in accordance with claim 14 wherein said auxiliary power unit inlet is coupled downstream from said fan such that airflow channeled to said auxiliary power unit is at an increased pressure than airflow entering said propelling gas turbine engine inlet.

16. An aircraft gas turbine engine assembly in accordance with claim 14 wherein said auxiliary power unit exhaust is coupled in flow communication with said core engine exhaust.

17. An aircraft gas turbine engine assembly in accordance with claim 14 wherein said auxiliary power unit exhaust is coupled in flow communication with said bypass duct.

18. An aircraft gas turbine engine assembly in accordance with claim 14 wherein said auxiliary power unit exhaust is coupled in flow communication with said bypass duct and said core engine exhaust.

19. An aircraft gas turbine engine assembly in accordance with claim 14 wherein said auxiliary power unit facilitates generating increased shaft horsepower from said auxiliary power unit turbine during operation.

20. A gas turbine engine assembly comprising:

a gas turbine engine comprising a compressing means for raising the density of air entering the gas turbine engine and a duct configured to receive air from the compressing means;

an auxiliary power unit comprising an inlet in flow communication with the duct and a turbine for extracting power from the flow through the inlet; and a mixing damper coupled in flow communication with the turbine of the auxiliary power unit and the exhaust of the gas turbine engine.

21. A gas turbine engine assembly as in claim 20 wherein the auxiliary power unit further comprises a combustor in flow communication with the duct.

22. A gas turbine engine assembly as in claim 20 wherein the compressing means comprises a fan.

23. A gas turbine engine assembly as in claim 20 wherein the compressing means comprises at least one compressor.

* * * * *